(12) United States Patent
Lin

(10) Patent No.: US 9,229,178 B2
(45) Date of Patent: Jan. 5, 2016

(54) PHOTOELECTRIC COUPLING MODULE WITH FIBER MODULE CONNECTED TO LENS MODULE BY POSITIONING POLE

(71) Applicant: HON HAI PRECISION INDUSTRY CO., LTD., New Taipei (TW)

(72) Inventor: I-Thun Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 115 days.

(21) Appl. No.: 13/968,403

(22) Filed: Aug. 15, 2013

(65) Prior Publication Data

US 2014/0199031 A1    Jul. 17, 2014

(30) Foreign Application Priority Data

Jan. 17, 2013    (TW) .............................. 102101759 A

(51) Int. Cl.
| | |
|---|---|
| G02B 6/42 | (2006.01) |
| G02B 6/38 | (2006.01) |
| G02B 6/36 | (2006.01) |
| G02B 6/32 | (2006.01) |

(52) U.S. Cl.
CPC ............ *G02B 6/4204* (2013.01); *G02B 6/4292* (2013.01); *G02B 6/32* (2013.01); *G02B 6/3885* (2013.01)

(58) Field of Classification Search
CPC ...... G02B 6/32; G02B 6/4292; G02B 6/4204; G02B 6/3885
See application file for complete search history.

(56) References Cited

U.S. PATENT DOCUMENTS

| | | | | |
|---|---|---|---|---|
| 5,940,558 | A * | 8/1999 | Bishop et al. ................... | 385/52 |
| 6,318,909 | B1 * | 11/2001 | Giboney et al. ................ | 385/90 |
| 6,874,952 | B2 * | 4/2005 | Nishimura ...................... | 385/89 |
| 7,025,511 | B2 * | 4/2006 | Nakajima ....................... | 385/93 |
| 7,850,373 | B2 * | 12/2010 | Ishigami et al. ................ | 385/92 |
| 8,382,384 | B2 * | 2/2013 | Nekado et al. .................. | 385/92 |
| 8,523,457 | B2 * | 9/2013 | Liu et al. ......................... | 385/74 |
| 8,885,990 | B2 * | 11/2014 | Kawai ............................. | 385/14 |
| 2003/0223701 | A1 * | 12/2003 | Furumai et al. ................ | 385/73 |

* cited by examiner

*Primary Examiner* — Akm Enaeyt Ullah
(74) *Attorney, Agent, or Firm* — Novak Druce Connolly Bove + Quigg LLP

(57) ABSTRACT

A photoelectric coupling module includes a fiber module and a lens module. The fiber module defines a number of receiving holes and at least one positioning hole. The lens module includes a main body and at least one positioning pole. The main body includes a lens portion and a receiving portion. The lens portion includes a central portion and an edge portion surrounding the central portion, the central portion includes a plurality of lenses. The receiving portion is positioned on the edge portion. The at least one positioning pole is received in the receiving portion, and is positioned on the edge portion. One end of the fiber module is received in the receiving portion. The at least one positioning pole is received in the at least one positioning hole, and the lenses are aligned with the receiving holes.

1 Claim, 2 Drawing Sheets

PHOTOELECTRIC COUPLING MODULE WITH FIBER MODULE CONNECTED TO LENS MODULE BY POSITIONING POLE

BACKGROUND

1. Technical Field

The present disclosure relates to photoelectric technologies and, particularly, to a photoelectric coupling module.

2. Description of Related Art

Photoelectric coupling modules generally include a fiber module and a lens module coupled to the fiber module. The fiber module defines at least one positioning hole. The lens module includes a main body and at least one positioning pole extending outward from the main body. The positioning pole is received in the positioning hole to ensure a coupling accuracy of the fiber module and the lens module. However, as the positioning pole protrudes outward from the main body, and may be easily broke from the main body, which results in the stability of the photoelectric coupling module is decreased.

Therefore, it is desirable to provide a photoelectric coupling module, which can overcome the limitations described.

DETAILED DESCRIPTION

Embodiments of the disclosure will be described with reference to the drawings.

Figure 1:
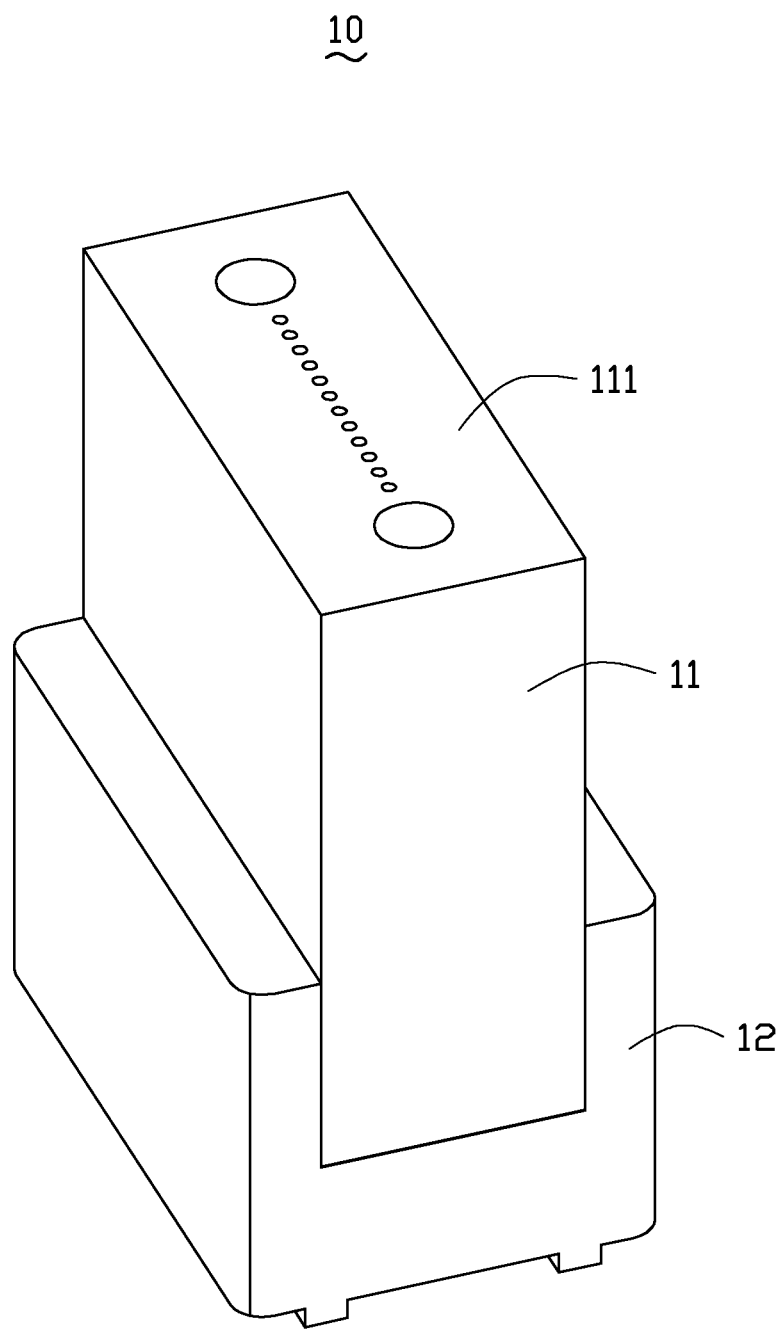
FIG. 1 is a schematic view of a photoelectric coupling module in accordance with an exemplary embodiment.
Figure 2:
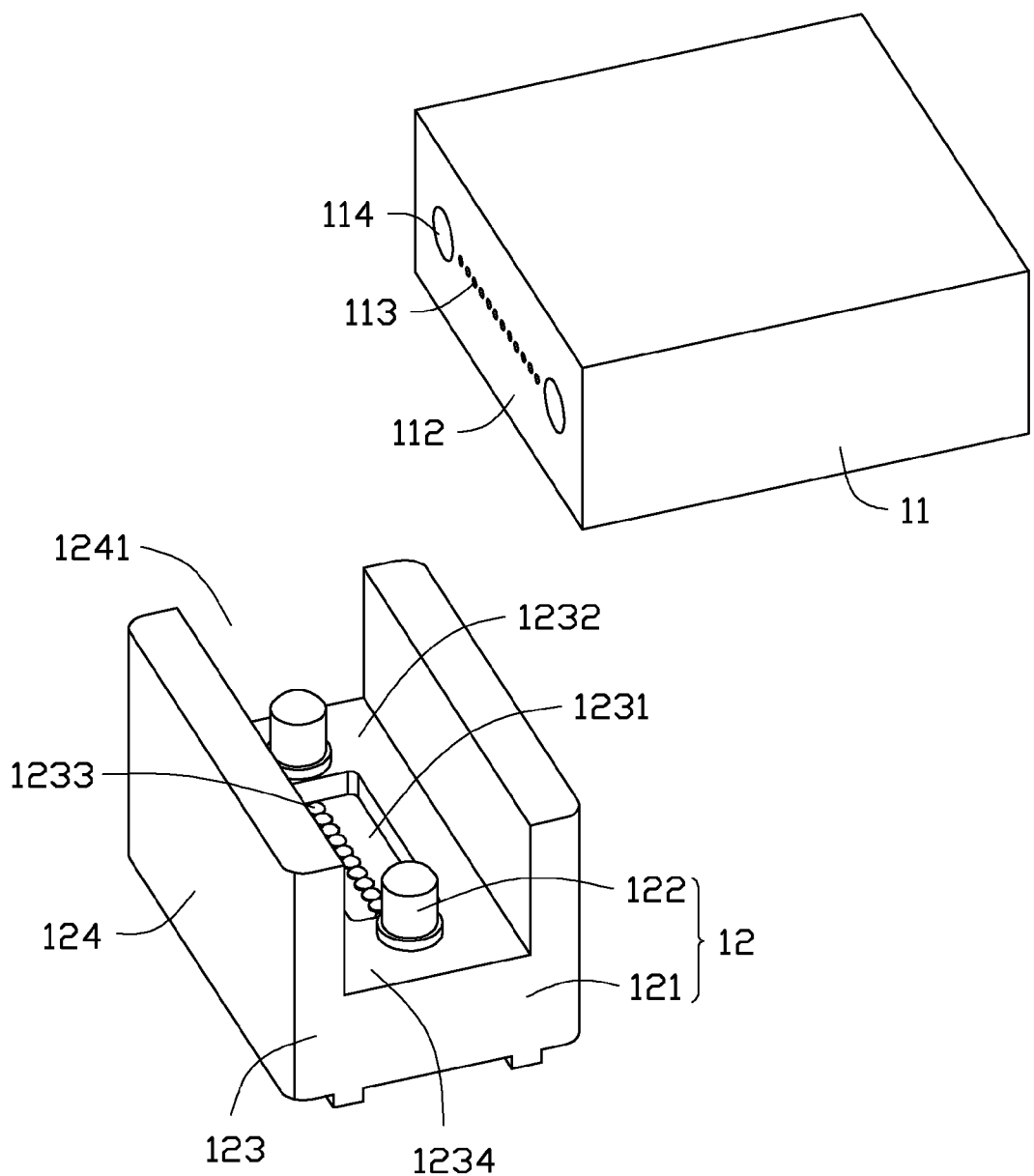
FIG. 2 is an isometric, exploded, and schematic view of the photoelectric coupling module of FIG. 1.

FIGS. 1-2 show a photoelectric coupling module 10, according to an exemplary embodiment. The photoelectric coupling module 10 includes a fiber module 11 and a lens module 12.

The fiber module 11 is a cuboid, and is made of plastic material. The fiber module 11 is integrally molded. The fiber module 11 includes a front surface 111 and a rear surface 112 opposite to the front surface 111. The fiber module 11 defines a number of receiving holes 113 running through the front surface 111 and the rear surface 112, and at least one positioning hole 114 in the rear surface 112.

The receiving holes 113 are substantially parallel with each other and perpendicular to the front surface 111 and the rear surface 112. The receiving holes 113 are linearly and equidistantly arranged. The receiving holes 113 are used for receiving optical fibers (not shown). The positioning hole 114 is parallel to the receiving hole 113. In the embodiment, the number of the positioning holes 114 is two and the positioning holes 114 are adjacent to two opposite sides of the fiber module 11. The receiving holes 113 are positioned between the two positioning holes 114. The positioning holes 114 can be through holes or blind holes. An internal diameter of the positioning holes 114 is greater than an internal diameter of the receiving hole 113.

The lens module 12 is a cuboid, and is made of plastic material. The lens module 12 is integrally molded. The lens module 12 includes a main body 121 and at least one positioning pole 122. The main body 121 includes a lens portion 123 and a receiving portion 124. The lens portion 123 includes a central portion 1231 and an edge portion 1232 surrounding the central portion 1231. A thickness of the central portion 1231 is less than a thickness of the edge portion 1232. The central portion 1231 includes a number of lenses 1233. The lenses 1233 are substantially linearly arranged. The number of the lenses 1233 corresponds to the number of the receiving holes 113.

The edge portion 1232 includes a supporting surface 1234. The receiving portion 124 includes a receiving room 1241, and is positioned on the supporting surface 1234. A size of a cross-sectional surface of the receiving room 1241 is slightly greater than a cross-sectional surface of the fiber module 11. In the embodiment, the holding portion 124 includes two positioning plates 1241. The two positioning plates 1241 are opposite to each other. The at least one positioning pole 122 is positioned on the supporting surface 1234, and is received in receiving room 1241. An external diameter of the positioning pole 122 is substantially equal to an internal diameter of the positioning hole 114. In the embodiment, the number of the positioning poles 122 is two. The lenses 1233 are arranged between the two positioning poles 122.

In assembly, one end of the fiber module 11 is received in the receiving room 1241 of the receiving portion 124. The positioning poles 122 are received in the positioning holes 114. The lenses 1233 of the lens module 12 are respectively aligned with the receiving holes 113 of the fiber module 11.

In use, light rays projected on the lenses 1233 are converged by the lenses 1233, and then emit into the optical fibers received in the receiving hole 113. Light rays emitted from the optical fibers are projected to the lenses 1233, the lenses 1231 converge the light rays to a photo diode (not shown).

In the embodiment, as one end of the fiber module 11 is received in the receiving room 1241 of the receiving portion 124, the positioning poles 122 will be harder break from the main body 121. Therefore, the stability of the photoelectric coupling module 10 is increased.

Particular embodiments are shown and are described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A photoelectric coupling module, comprising:
    a fiber module defining a plurality of receiving holes and at least one positioning hole; and
    a lens module, comprising:
        a main body comprising a lens portion and a receiving portion, the lens portion comprising a central portion and an edge portion surrounding the central portion, the central portion comprising a plurality of lenses, the receiving portion positioned on the edge portion, the receiving portion defining a receiving space;
        at least one positioning pole received in the receiving space and positioned on the edge portion;
    wherein one end of the fiber module is received in the receiving space, the at least one positioning pole is received in the at least one positioning hole, and the lenses are aligned with the receiving holes;
    wherein the edge portion comprises a supporting surface, the receiving portion and the at least one positioning pole are positioned on the supporting surface;
    wherein the receiving portion comprises two positioning plates oppositely positioned on the supporting surface, and one end of the fiber module is received between the two positioning plates.

* * * * *